United States Patent Office 3,042,666
Patented July 3, 1962

3,042,666
POLYETHER DERIVATIVES
Robert Paul Gentles, Manchester, England, assignor to Imperial Chemical Industries Limited, London, England, a corporation of Great Britain
No Drawing. Filed Feb. 24, 1959, Ser. No. 794,844
Claims priority, application Great Britain Feb. 26, 1958
5 Claims. (Cl. 260—209)

This invention relates to the manufacture of polyether derivatives of polyhydroxylic compounds employing dimethyl sulphoxide as reaction medium.

It is well known that alkylene oxides and other epoxides have the ability to react with hydroxyl groups contained by a wide variety of low melting polyhydroxylic organic compounds, as for example glycerol and trimethylolpropane, but hitherto difficulties have been encountered in reacting alkylene oxides and other epoxides with solid polyhydroxylic compounds of high melting point such as pentaerythritol and certain sugars because of the absence of suitable inert solvents for these polyhydroxylic compounds which would serve as media in which to conduct the reaction. Most solvents for polyhydroxylic compounds also react with alkylene oxides and other epoxides whilst solvents inert to alkylene oxides and other epoxides do not usually dissolve polyhydroxylic compounds.

We have now found that dimethyl sulphoxide is an excellent solvent for many polyhydroxylic compounds, does not react with alkylene oxides or other epoxides, and is not decomposed by the alkaline substances commonly employed as catalysts in the formation of alkylene oxide or epoxide addition compounds, furthermore it can be recovered from the reaction mixture by distillation under reduced pressure.

Thus according to the present invention we provide a process for the manufacture of polyether derivatives of polyhydroxylic compounds by reacting polyhydroxylic compounds with alkylene oxides or epihalohydrins, or mixtures thereof, or if desired with such epoxides or epoxide mixtures admixed with polyepoxides, characterised in that the polyhydroxylic compounds melt at a temperature above 120° C. or melt only with decomposition and are soluble in dimethyl sulphoxide and in that the reaction is conducted in dimethyl sulphoxide as reaction medium.

A wide variety of polyhydroxylic compounds may be employed according to the process of the invention such as trimethylolethane, pentaerythritol, tetramethylolcyclohexanol, sucrose, α-methyl glucoside and other sugars, sugar alcohols such as mannitol, inositol, quebrachitol and polyvinyl alcohol.

Examples of alkylene oxides suitable for preparing the polyether derivatives are ethylene oxide, propylene oxide and butylene oxide. As an example of an epihalohydrin to be used alone or in admixture with alkylene oxides in the preparation of the polyether derivatives there may be mentioned epichlorohydrin. Suitable polyepoxides which may be used admixed with any of the above epoxides or their mixtures are 1:2-3:4-diepoxybutane, diallylether dioxide, 2:6-dioxaspiro-[3.3]-heptane.

The reaction between the polyhydroxylic compounds and the above mentioned epoxides may be performed at a temperature of from 50° C. to 150° C. preferably between 90° C. and 120° C. The alkaline catalysts employed to facilitate the aforesaid reaction may be any of those commonly employed in reacting epoxides with hydroxylic compounds as for example alkali metals and alkaline earth metals or hydroxides of such metals.

When polyepoxides are present in the reaction mixture the polyether derivatives are more highly branched than if polyepoxides are omitted from the reaction mixture. The polyether derivatives obtained according to the process of the invention contain hydroxyl groups at the ends of the polyether chains. The polyether derivatives react readily with organic isocyanates and are useful as intermediates in the preparation of polyurethane foams and surface coatings.

The invention is illustrated but not limited by the following examples in which parts and percentages are by weight.

Example 1

A stainless steel reaction vessel fited with stirrer, pressure gauge, cooling coil, and thermo-couple, is thoroughly dried, charged with 136 parts of pentaerythritol (1 molar equivalent), 250 parts of dimethyl sulphoxide (sufficient to dissolved 75 parts of pentaerythritol at 100° C.), and 9 parts of powdered potassium hydroxide. The vessel and contents are heated in an oil bath to 100° C. and stirred at this temperature and 30 mm. pressure in a slow current of inert gas for 1 hour.

1410 parts of propylene oxide (24.3 molar equivalents, corresponding to 6.08 propyleneoxy groups per hydroxyl group of pentaerythritol) are added to the stirred mixture during 4 hours at 100–110° C. The reaction product is stripped of dimethyl sulphoxide at 150° C. (internal temperature) under 30 mm. pressure. 9 parts of powdered adipic acid are stirred into the reaction product to neutralise the catalyst, followed after a few minutes by additions of ½% (on weight of product) of 100 volume hydrogen peroxide such additions being made at ½ hour intervals at 100° C. until no further improvement in colour of the product is achieved (about 3 additions).

After removing water at 30 mm. pressure in a stream of inert gas for 1 hour at 100° C. and filtering, there is obtained 1400 parts of a clear viscous liquid, hydroxyl value (expressed as percent OH) 5.4%, viscosity at 25° C., 290 centistokes.

Example 2

Employing the same equipment and procedure as in Example 1 136 parts of pentaerythritol (1 molar equivalent), 250 parts of dimethyl sulphoxide, and 9 parts of powdered KOH are treated with 3,570 parts of propylene oxide (61.6 molar equivalents, corresponding to 15.4 polyoxypropylene groups per hydroxyl group of pentaerythritol).

The solvent is removed at 105° C. (internal temperature) under 30 mm. pressure. 9 parts of powdered adipic acid are then stirred in and a peroxide bleach carried out. The product is dried and filtered as before. There is obtained 3600 parts of a clear viscous liquid, hydroxyl value (expressed as percent OH) 2.6%, viscosity at 25° C., 400 centistokes.

Example 3

Employing the same equipment and procedure as in Example 1 342 parts of sucrose (1 molar equivalent) and 8 parts of powdered potassium hydroxide in 350 parts of dimethyl sulphoxide are treated with 500 parts of propylene oxide (8.6 molar equivalents, corresponding to 1.1 polyoxypropylene groups per hydroxyl group of sucrose) at 110° C. during 2½ hours.

Dimethyl sulphoxide is removed from the product at 105° C. (internal temperature) under 30 mm. pressure. 7 parts of powdered adipic acid are stirred in, followed in a few minutes by addition of ½% (on weight of product) of 100 volume hydrogen peroxide such additions being made at ½ hour intervals at 100° C. until no further improvement in colour of the product is achieved (about 10 additions).

After removing water at 30 mm. pressure in a stream of inert gas for 1 hour at 100° C. and filtering, there is obtained 800 parts of a clear viscous, amber liquid, hydroxyl value (expressed as percent OH) 14.4%, viscosity at 25° C., 2425 centistokes.

Example 4

Employing the same equipment and procedure as in Example 1 342 parts of sucrose (1 molar equivalent) and 8 parts of powdered potassium hydroxide in 350 parts of dimethyl sulphoxide are treated with 1968 parts of propylene oxide (33.9 molar equivalents, corresponding to 4.2 polyoxypropylene groups per hydroxy group of sucrose). The solvent is removed at 105° C. (internal temperature) under 30 mm. pressure. 7 parts of powdered adipic acid are then stirred in, and the reaction product is bleached, stripped, and filtered as before to yield 2200 parts of a clear amber viscous liquid, hydroxyl value (expressed as percent OH) 7.0%, viscosity at 25° C., 1068 centistokes.

Example 5

513 parts of sucrose (1 molar proportion) are dissolved in 600 parts of dimethyl sulphoxide and heated to 90° C. in an atmosphere of nitrogen. A solution of 3 parts of sodium in 150 parts of dimethyl sulphoxide is added, the reaction vessel closed and 534 parts of ethylene oxide (8 molar proportions) is added during 1 hour: the pressure in the reaction vessel is maintained at 30–40 p.s.i. and the temperature rises to 133° C. The dimethyl sulphoxide is removed from the product by distillation at 30 mm. pressure, and the last traces removed by steam distillation. After drying by heating at 100° C. under a pressure of 30 mm. with a stream of nitrogen passing through, there is obtained 1025 parts of a dark brown viscous liquid of hydroxyl value (expressed as percent OH) 19.7%.

Example 6

136 parts of pentaerythritol (1 molar proportion) are dissolved in 400 parts of dimethyl sulphoxide and heated to 70° C. whilst a stream of nitrogen gas is passed through 2.4 parts of sodium methoxide are added and the mixture heated to and stirred at 100° C. whilst maintaining the nitrogen gas stream. The nitrogen gas stream is then stopped and ethylene oxide passed in whilst stirring at 100–110° C. until 353 parts (8 molar proportions) have been added. The dimethyl sulphoxide is removed from the product as described in Example 5. There is obtained 480 parts of a light brown viscous liquid of hydroxyl value (expressed as percent OH) 13.9%.

Example 7

182 parts of mannitol (1 molar proportion) are dissolved in 350 parts of dimethyl sulphoxide and heated to 100° C. whilst a stream of nitrogen gas is passed through. 1 part of sodium is added and the mixture stirred at 100° C. whilst maintaining the nitrogen gas stream until all the sodium has dissolved. The nitrogen gas stream is then stopped and ethylene oxide passed in whilst stirring at 100–110° C. until 268 parts (6 molar proportions) have been added. The dimethyl sulphoxide is removed by distillation at 0.2 mm. pressure. There is obtained 440 parts of a dark brown viscous liquid of hydroxyl value (expressed as percent OH) 22.4%.

What I claim is:

1. Process for the manufacture of polyether derivatives of polyhydroxylic compounds by reacting a polyhydroxylic compound selected from the group consisting of trimethylolethane, pentaerythritol, tetramethylolcyclohexanol, sucrose, α-methyl glucoside, mannitol, inositol, quebrachitol and polyvinyl alcohol which is soluble in dimethyl sulphoxide and incapable of being melted without decomposition below 120° C., with a compound selected from the group consisting of alkylene oxides, epihalohydrins, mixtures thereof and mixtures thereof with polyepoxides, said reaction being conducted in dimethyl sulphoxide as a reaction medium and at a temperature between about 50 and 150° C.

2. Process according to claim 1 wherein the reaction is conducted in presence of an alkaline catalyst.

3. A process as set forth in claim 1 in which the polyhydroxylic compound is pentaerythritol.

4. A process as set forth in claim 1 in which the polyhydroxylic compound is sucrose.

5. A process as set forth in claim 1 in which the reaction is carried out at a temperature between 90 and 100° C.

References Cited in the file of this patent

UNITED STATES PATENTS

| | | |
|---|---|---|
| 1,922,459 | Schmidt et al. | Aug. 15, 1933 |
| 2,492,955 | Ballard et al. | Jan. 3, 1950 |
| 2,602,789 | Schwartz et al. | July 8, 1952 |
| 2,652,394 | De Groote | Sept. 15, 1953 |
| 2,812,324 | Huber et al. | Nov. 5, 1957 |
| 2,870,216 | Sorensen et al. | Jan. 20, 1959 |